United States Patent [19]
Jones

[11] Patent Number: 6,088,950
[45] Date of Patent: Jul. 18, 2000

[54] STRUCTURAL PEST CONTROL SYSTEM

[76] Inventor: Ronald L. Jones, 4120 Onagh Pl., Suwanee, Ga. 30024

[21] Appl. No.: 09/050,282

[22] Filed: Mar. 30, 1998

Related U.S. Application Data

[60] Provisional application No. 60/051,883, Jul. 8, 1997.
[51] Int. Cl.$^7$ .............................. A01M 1/20; A01M 1/24
[52] U.S. Cl. ........................... 43/124; 43/132.1; 43/900; 52/101
[58] Field of Search ................................. 43/124, 132.1, 43/900; 52/101, 168, 741.3; 137/357; 239/200, 208, 209

[56] References Cited

U.S. PATENT DOCUMENTS

| | | | |
|---|---|---|---|
| 1,795,488 | 3/1931 | Hill | 43/124 |
| 2,012,651 | 8/1935 | Beall | 43/124 |
| 2,138,182 | 11/1938 | Lipthrott | 52/101 |
| 2,165,192 | 7/1939 | Muirhead | 52/101 |
| 2,198,011 | 4/1940 | Muirhead | 52/101 |
| 2,347,776 | 5/1944 | Gunn | 52/101 |
| 2,352,338 | 6/1944 | Muirhead | 52/101 |
| 2,581,521 | 1/1952 | Davis | 52/101 |
| 2,842,892 | 7/1958 | Aldridge et al. | 43/124 |
| 2,915,848 | 12/1959 | Griffin | 43/124 |
| 2,981,025 | 4/1961 | Woodson | 43/124 |
| 3,209,485 | 10/1965 | Griffin | 43/124 |
| 3,257,929 | 6/1966 | Kortvely | 454/280 |
| 3,330,062 | 7/1967 | Carter | 43/124 |
| 3,513,586 | 5/1970 | Meyer et al. | 43/124 |
| 3,665,662 | 5/1972 | Timbrook et al. | 52/101 |
| 3,676,949 | 7/1972 | Ramsey | 43/124 |
| 3,782,026 | 1/1974 | Bridges et al. | 43/124 |
| 4,040,215 | 8/1977 | Totsuka | 43/132.1 |
| 4,102,093 | 7/1978 | Harris | 52/101 |
| 4,282,691 | 8/1981 | Risdon | 52/101 |
| 4,528,787 | 7/1985 | Rittinge | 52/101 |
| 4,656,803 | 4/1987 | Chludil | 52/101 |
| 4,658,552 | 4/1987 | Mulford | 52/101 |
| 4,742,641 | 5/1988 | Cretti | 43/124 |
| 4,823,505 | 4/1989 | Jackson | 43/124 |
| 4,945,673 | 8/1990 | Lavelle | 43/124 |
| 5,058,312 | 10/1991 | Jackson | 43/124 |
| 5,097,641 | 3/1992 | Hand et al. | 52/101 |
| 5,203,795 | 4/1993 | Balamut et al. | 43/124 |
| 5,303,523 | 4/1994 | Hand et al. | . |
| 5,309,669 | 5/1994 | Jackson | 43/124 |
| 5,347,749 | 9/1994 | Chitwood et al. | . |
| 5,361,533 | 11/1994 | Pepper | 43/124 |
| 5,417,017 | 5/1995 | Toutountzis | 52/101 |
| 5,427,417 | 6/1995 | Lechuga | 52/101 |
| 5,678,362 | 10/1997 | Hulls et al. | 52/101 |
| 5,695,776 | 12/1997 | Ballard et al. | . |
| 5,802,779 | 9/1998 | Hulls et al. | 52/101 |
| 5,819,466 | 10/1998 | Aesch et al. | 52/101 |
| 5,918,427 | 7/1999 | VanderWerf | 52/101 |

*Primary Examiner*—Michael J. Carone
*Assistant Examiner*—Darren W. Ark
*Attorney, Agent, or Firm*—Deveau & Marquis; Harold L. Marquis; Ryan A. Schneider

[57] ABSTRACT

An insecticide method to control and kill insects in the exterior walls of architectural structures, and the apparatus for doing so. This method is particularly useful for stucco walls and involves cutting cavities in the stucco wall near the soil line around the circumference of the structure. An inspection panel permits visual inspection to determine if insects are present. If so, a termiticide can be injected into the cavity. Alternatively, tubing with periodic holes and injection ports for dispensing an insecticide can be placed in the cavity. This apparatus includes an inspection panel to aide in the detection of insects and also a protection panel which is painted or fabricated to coordinate with or match the exterior wall. A method is also provided for making bait available to the insects that traverse the cavity and injecting an insecticide into the cavity when insects appear.

9 Claims, 3 Drawing Sheets

STRUCTURAL PEST CONTROL SYSTEM

This application claims the benefit of U.S. Provisional Ser. No. 60/051,883 filed Jul. 8, 1997.

BACKGROUND OF THE INVENTION

1. Field of The Invention

The present invention relates to the field of structural pest control. The invention relates more specifically to the control, prevention and eradication of subterranean pests in structures. Preferably, the present invention controls termite infestation in structures, namely households, commercial buildings and other structures where there exists a void or small space behind a stucco, brick, block, wood or any other type of exterior or veneer finish.

2. Background

Conventional pest control systems have been found to be ineffective in many situations. Damage caused to structures because of ineffectual pest control causes the significant loss of integrity to structures, and can cost property owners a significant amount in remediation measures.

Termites present a particular problem for structures that have foam insulation covered by a stucco veneer. Termites use the void area behind the stucco veneer as a hidden pathway into the structure in their search for food and moisture. In this fashion, termites can cause their damage while remaining undetected for years in the void area behind the veneer.

While the disclosure herein focuses particularly on termite control, other pests cause structural damage in similar ways, for example, carpenter ants and the like, and that the present invention is also designed to control these pests.

Subterranean termites cause damage to more American homes each year than damage incurred by fires, lightening, tornadoes, and hurricanes, combined. Termites infest every state in the United States except Alaska. In one acre of land, there may be as many as a dozen termite colonies. While most people believe that termites attack only structural wood members, they will, in fact, attack anything that contains cellulose, for example, books, carpets, drywall, flooring, subflooring, fabrics, furniture, trim, window frames and more.

Termites can cause extensive damage before they are ever discovered because they work silently and remain hidden from view. Termites are creatures perfectly adapted for what they can do, the degradation of cellulose. With present control systems, it is virtually impossible to fully destroy a termite colony. Their subterranean nests are nearly impossible to locate and, therefore, cannot be eliminated by traditional treatment methods. It has been estimated that as many as 245,000 termites comprise a single colony, making their numbers far too great to be entirely eliminated with a single pest control application.

Presently, termite treatment methods focus on creating a chemical barrier between the structure to be protected and the surrounding soil. Since subterranean termites require moisture to survive, termites frequently seek out a source of moisture. They find moisture in both the ground and cellulose, which leads them ultimately to find the structure. It is assumed that by creating a barrier under and around the structure, new termites cannot enter inside it and termites already inside die due to the lack of moisture.

Chlorinated hydrocarbons were once the primary chemical weapon used to fight termites. Recently, though, they were removed from the market. Since 1987 when chlorodane, a chlorinated hydrocarbon, was taken off the market, the number of termite retreatments required has increased significantly due to the failure of present chemical barriers. The termiticide chemicals used today are just not as effective as the chlorinated hydrocarbons used in the past.

Several building techniques utilizing foam insulation have been known since the early 1980's and have particular pest control problems as discussed previously. By 1992 it was estimated that 50% of new buildings use some type of foam insulation. Unfortunately, problems with termite infestations arise when, as a continuous sheet, foam insulation is placed with portions of it resting below grade. Termites can use the below grade foam insulation as a highway into the structure by tunneling through the foam, or between the foam and masonry. The termites remain undetected until severe damage has occurred because the insulation is hidden from view by, e.g., a stucco veneer.

This type of infestation is a serious problem for Exterior Insulation and Finish Systems (EIFS). EIFS are multi-component exterior wall systems which generally comprise an insulation board; an adhesive or mechanical attachment of the insulation board to the substrate or existing wall surface; a base coat reinforced with fiber glass mesh on the face of the insulation board; and, a finish coat which protects the entire system and which can be applied in a wide variety of colors and textures. Synthetic stucco and various mortar type mixes are also referred to as the EIF System. A disadvantage in the installation of this wall system is that it may allow moisture damage if not properly finished.

3. EIFS

Adhesives are most often used to anchor the insulation board to the substrate. Mechanical fasteners are particularly recommended when the substrate type or condition prevents adhesion. Attachments are designed to resist wind, gravity, and the effects of thermal movement.

Insulation boards are the basic building blocks of low-cost creative architectural shaping. At R-3.8–5.6 per inch, they also make EIFS presently one of the most energy-efficient wall systems available. Exterior insulation creates an unbroken casing, preventing thermal bridging through studs and outlets. Insulation boards allow for expansion and contraction while maintaining the integrity of the finish.

The base coat applied on the outside of the insulation boards creates a vapor permeable barrier against weather and reinforces the exterior surface against impact. It envelopes the exterior, and teamed with insulation board, greatly reduces air infiltration and thus energy consumption.

The primer promotes adhesion and reduces the chance of efflorescence. It improves and stabilizes the color and appearance of the finish. The finishes may be a decorative textured finish applied over the base coat and primer. It is integrally colored and formulated with 100% acrylic polymers to resist UV effect.

EIFS began in Sweden in the 1940's. It was simply a form of plaster that was isolated from the movement of the building by a layer of mineral wool. This isolation minimized cracking. Soon thereafter, similar systems began to be used in other parts of Europe. In the 1960's the system which incorporates rigid polystyrene and mesh-reinforced coatings started being used in Germany. In 1969, it was introduced in the United States. EIFS products did not see widespread use in residential frame construction until the mid 1980's. As the product was being developed and marketed in the United States, modifications began to be made in the system. Marketing and product engineering evolved the product into what is now know as EIFS or synthetic stucco. Currently, EIFS is the terminology used to describe a modern stucco-like construction technique.

Synthetic stucco may be an acrylic polymer which is applied over the fiberglass mesh. The mesh covers the foam insulation board, which is typically attached to a gypsum sheating board, plywood or masonry wall. The gypsum sheating and the plywood are typically nailed to wood framing. The fiber glass mesh is coated with the base coat and the finish coat of acrylic, to resemble stucco.

Termite problems arise when the synthetic stucco is installed improperly. Moisture can enter the structure through small cracks in the synthetic stucco and through cracks around poorly caulked windows, doors, sealed joints and flashing. Once behind the synthetic stucco surface, water is trapped because of the low permeability of the stucco and the foam board insulation.

Rigid board insulation, foam board and other similar material such as polystyrene, polyisocyanurate (collectively referred to as "RBI") and synthetic stucco when used or installed improperly may lead to the following problematic conditions:

(A) The retention of moisture in walls. Cracks around windows, doors, sealed joints and flashing as well as small cracks in the surface of synthetic stucco will allow moisture in the form of rain, snow, or condensation, to enter behind the synthetic stucco or RBI and remain trapped there. The presence of moisture in proximity to wood is a condition which is conducive to infestation by, among others, subterranean termites, wood decay fungi and carpenter ants. The trapped moisture allows subterranean termites to remain above ground without a need to return to the soil. Excess moisture in wood leads to wood decay. In addition, carpenter ants often excavate and nest in wood. Even when not installed at or below grade, RBI and synthetic stucco may retain moisture in walls.

(B) The inability to detect wood destroying organism infestations. When used at or below ground level, the above building materials may make detection of wood destroying organisms virtually impossible in the early stages of degradation. While termites do not gain nourishment from the RBI, they readily tunnel through it in order to reach the structural wood. Oftentimes, the RBI is hidden behind siding, providing a hidden pathway which allows subterranean termites to reach structural wood undetected.

(C) The inability to properly treat the structure for wood destroying organism infestation and to protect it from wood destroying organism damage. If the structure is to be protected by a barrier treatment, soil adjacent the exterior of the RBI and synthetic stucco must be treated with termiticide down to the footer. If termiticide does not reach to the footer, the soil beneath the RBI/synthetic stucco must be further treated to prevent subterranean termites from tunneling up from the soil beneath to reach the structural wood by tunneling between the RBI and synthetic stucco, and the foundation wall. Yet oftentimes, it is neither feasible nor possible to treat underneath the bottom of RBI and synthetic stucco which extend deep into the soil (i.e. basement homes) and when RBI has been used underneath a slab.

Thus it can be seen that there is a need for an effective pest control system, and, more specifically, a subterranean termite control system that can conveniently, effectively and consistently control termite infestations. It is to the provision of such a method and apparatus that the present invention is primarily directed.

3. DESCRIPTION OF PRIOR ART

Traditional termite pre-treatments and post-treatments do not effectively eliminate termite infestations. Presently, the most effective method of control is to cut the stucco off at approximately 6–9 inches above the soil grade exposing the concrete slab so that this area can be visually inspected for termite mud tubes. Obviously, this approach leaves an unsightly appearance. In 1997, a pest treatment system (U.S. patent application Ser. No. 60/021,378) marketed under the name of Stucco Guard™ was introduced. This system involves cutting a channel into the stucco veneer around the exterior perimeter of the structure. A perforated tubing system is then installed in the channel. The Stucco Guard™ tubing has perforations spaced at approximately every 3.5 inches. An injection port is installed at regular intervals of approximately 10 feet around the perimeter of the structure. A stucco mix is used to seal the system into place. The Stucco Guard™ system allows for the injection of termiticides into the perforated tubing through the injection ports behind the stucco which creates a termite barrier. Although the Stucco Guard™ method is an improvement over current pest control methods, it does not allow for visual inspections. Also, in some cases, this method does not deliver enough termiticide to provide an adequate termite barrier.

Therefore, current termite control systems have two disadvantages in regards to the protection of a structure's exterior. The first problem is that there is no effective way to treat the void area behind the stucco with termiticide based upon an indication that termites may be present. The second is that there is no way to visually inspect the void area for signs of termites. One aspect of U.S. patent application Ser. No. 60/021,378 relates to the injection of termiticide behind stucco. The present invention primarily relates to both the injection and placement of termiticide and the visual inspection of the void areas behind the exterior wall.

BRIEF SUMMARY OF THE INVENTION

Briefly described, the present invention overcomes the above-mentioned disadvantages, and substantially improves upon current practices by providing an apparatus for termite inspection of structures. It is an objective of the present invention to provide a pest control system that allows for the inspection of interior portions of the exterior layer or layers of a wall of a structure in order to check for termites. This systems allows for termiticide injection at any location where termites are located with the inspection apparatus.

Further objectives of the present invention are to also provide an expansion joint where needed for structures comprising an EIF System, and to provide a built-in termite baiting system.

The present invention provides a termicidal injection and inspection system around the exterior perimeter of the structure. It may have a termiticide injection apparatus for either selectively treating said termites or treating throughout the entire apparatus. The present invention may be used in conjunction with, or independent of, the system described in patent application Ser. No. 60/021,378.

Generally, to implement the present system, a cavity is first created around the circumference of the exterior portion of a structure. The cavity may be created by removing existing material, such as the stucco, or it may be created during the initial construction of the structure, by intentionally creating a groove or cavity in the exterior portion of the structure. This groove or cavity, in the preferred embodiment, extends to a depth sufficient to expose the substrate of the structure; however, the cavity depth can be extended into the substrate of the structure. Several layers of substrate may be penetrated if needed. Furthermore, the preferred embodiment employs a cavity which is constructed generally parallel to the soil grade at a distance of between approximately three to six inches above the soil. However, this cavity need not be parallel to the soil grade, nor this close to the top of the soil.

The exterior building material of the wall and void areas are exposed through the cavity in a horizontal cross-sectional manner so that, from the exterior of the building, an observer may look at the substrate of the structure.

In a first preferred embodiment of the present invention, upon construction of the cavity, a protection shield is installed in the bottom of the cavity to prevent termites from entering the structure from the ground and traversing the cavity into the upper wall. When this termite shield has been installed, an inspection panel is placed over the cavity so that termite activity can be observed through the inspection panel. The preferred inspection panel is releasably secured over the cavity and is constructed of clear PVC material, but can be constructed of any suitable material allowing for visual inspection of the cavity, preferably a transparent material. This system is preferred because it does not involve the utilization of any teriniticides until termite activity is observed.

In the first preferred embodiment, periodic holes may be provided in the inspection panel for the injection of a termiticide at any location where termites are located. These holes may be sealed or plugged to allow for easy access when a termiticide needs to be injected.

Weep holes may be provided at periodic intervals in the exterior of the structure to allow moisture to be drained from the bottom of the cavity.

In the second preferred embodiment of the present invention, upon construction of the cavity, tubing is placed into the cavity. The tubing has holes designed to allow the application of a termiticide into the cavity. The tubing system used may be the tubing system disclosed in U.S. patent application Ser. No. 60/021,378. Any suitable securing means may be used to maintain the tubing system within the cavity. External injection ports are used for termiticide injection, extending from the tubing at predetermined intervals allowing for the subsequent retreatments of the building with termiticide. In the second preferred embodiment, the distance between external injection ports is approximately ten feet.

With the tubing system installed, an inspection panel is placed over the cavity so that the intake end of the external injection ports are received through holes in the panel. The preferred inspection panel is releasably secured over the cavity and is constructed of clear PVC material. PVC is the preferred material because it is easy to cut, install and inexpensive to produce. Preferably, the holes for receiving the external injection ports are pre-formed, either by drilling, fabrication, machining or the like, into the inspection panel.

The inspection panel may be releasably secured to the exterior wall or cavity by any suitable attachment means, but preferably by a track or prong assembly. The track assembly may consist of two pronged planes extending into the cavity region which run planar to the upper and lower walls of the cavity. One pronged plane fits snug against the upper cavity wall while the other pronged plane fits snug against the lower cavity wall to hold the inspection panel in place. While the pronged planes are not essential to the invention, they provide an excellent installation mechanism for the inspection panel which is substantially watertight when utilized in conjunction with a sealant which keeps moisture out and termiticide in. Alternatively, the inspection panel may be bolted, screwed, glued, or employ other suitable means for attachment which maintain the inspection panel in a substantially watertight fashion. It is preferred that the inspection panel overlap the exterior finish on both the top and bottom of the cavity to provide adequate room to apply a glue sealant if such attachment means is employed either alone or in combination with prongs.

While in the second preferred embodiment, the inspection panel has holes which allow the external injection ports of the tubing to extend from the cavity through the panel to the exterior portion of the structure, the inspection panel may be fashioned without holes. The external injection ports may extend flush with the inspection panel and be sealed or otherwise held in place, or may extend further out from the holes.

Once the second embodiment is installed, termiticide may be injected through the external injection ports. Based on the treatment program designed for each structure, a specific termiticide or combination of termiticides can be selected. Once the termiticide is injected into the injection ports, a protection panel may be installed over the inspection panel. The protection panel may be painted or formed to match the color and texture of the wall's exterior. The protection panel may be installed by any known installation means including adhesive, bolts, screws or the like; however, preferably, the protection plate is constructed so that it clips to the edges of the inspection panel to allow for easy installation and removal. This protection panel may also be used in respect to the first embodiment.

In a third preferred embodiment, the tubing and injection ports are formed in the clear inspection panel e.g., in a channel inside the inspection panel. Perforations are formed into this tubing for the application of the termiticide. The tubing, perforations and injection ports serve primarily the same purpose as described in the second preferred embodiment. Preferably, in the tubing or interior channel, perforations and injection ports are formed at the time the panel is constructed as a unitary structure. The attachment means of the inspection and protection panels may be substantially similar to the embodiments described above.

A plug constructed of any suitable material including the portion of PVC which was removed in the manufacture of the injection port, may also be utilized in any of embodiment to fill the holes in the inspection panel to create a watertight seal.

With the second and third embodiments, the system should be serviced on a yearly basis, however, any reasonable periodicity may be used. The system should be treated using a power spray rig with a maximum pressure of approximately 30 psi in which a solution of termiticide is injected into the tubing or interior channel.

All homes which have an EIFS exterior require that an expansion joint be installed at every floor level of the house. Unfortunately, many homes are missing this expansion joint. Homes with an exterior EIF System constructed without the proper expansion joints will develop stress cracks throughout the system. Typically, this situation leads to the catastrophic failure of the system. When the present system is installed within, preferably, five to six inches of the floor line, it further benefits the premise's owner as it also functions as an expansion joint for structures which have an EIFS exterior. It has been found that the present invention may save a homeowner up to 67% of the cost of cutting the stucco off and installing a retrofit expansion joint, which is the current method of expansion joint installation.

There are various other embodiments of the present invention.

The present invention may be modified to become a baiting system. In this fourth embodiment, a baiting system replaces the tubing system, where the baiting system comprises small reservoirs which will hold termite baiting material. At approximately 5 foot intervals, the baiting system has a bait reservoir on the inside of the inspection panel. The bait is added through the holes in the inspection panels, and the holes may be capped upon baiting. All of these embodiments may have a protective panel and weep holes as described above.

The initial treatment with the baiting system is done with a standard termiticide such as Premis-75™ to establish a protective barrier. This embodiment should also be inspected on a yearly basis. If termite activity is discovered during an inspection, a termite bait is placed in the bait reservoir. The termite bait is designed to eliminate the termite colony. Typical baits are hexaflumuron, an insect growth-like regulator, N-Ethylperfluorooctanesulfonamide, a dose responsive stomach toxic, or any other suitable termite bait. The bait reservoir can be of several designs so long as it will fit into the approximately 1.5 inch channel.

These and other objects, features and advantages of the present invention will become more apparent upon reading the following specification in conjunction with the accompanying drawing figures.

DETAILED DESCRIPTION OF A PREFERRED EMBODIMENT

Figure 1:
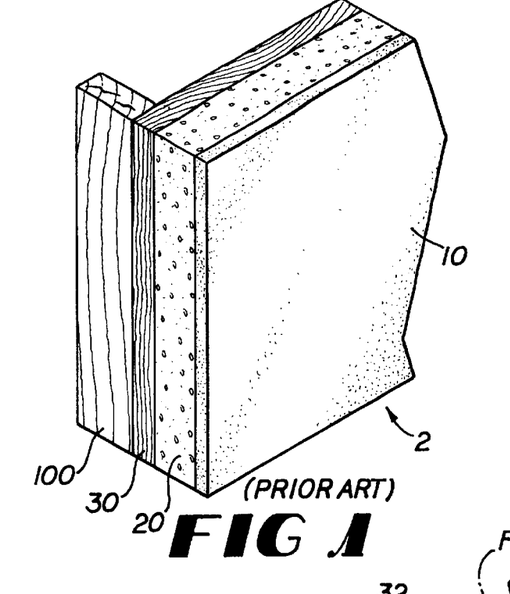
FIG. 1 is a perspective view of a prior art EIF System.

Like reference numerals represent like parts throughout the several views in the drawing figures. FIG. 1 shows a perspective view of an EIF System 2. Typically, insulation board 20 is adhesively secured to the prior existing exterior wall 30 (substrate or inner component) of the structure. The substrate 30 is securely mounted against frame structure 100 by conventional building techniques. The base coat 10 (exterior or outer component) on the outside of the insulation board 20 creates a vapor permeable barrier against weather and reinforces the exterior surface against impact. Base coat 10 may include reinforcing mesh, primer and finishes as desired by the homeowner. The base coat 10 also may incorporate synthetic stucco.

Figure 2:
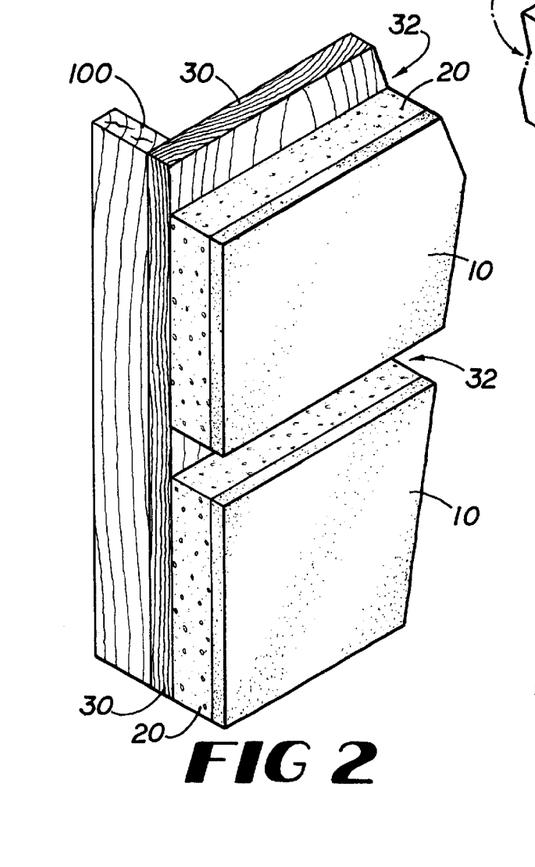
FIG. 2 is a perspective view of an inspection channel in an EIF system according to the first preferred embodiment of the present invention.

FIG. 2 shows a perspective view of the EIF System with channels or cavities 32 cut therein. The channel 32 may be created by removing the existing material, such as the stucco, or it may be created during the initial construction of the structure, by intentionally creating a channel 32 in the outer component 10 of the structure. This cavity 32 in the preferred embodiment extends a depth sufficient to expose the substrate 30 of the structure; however, the cavity depth can extend into the substrate 30 of the structure. Several layers of insulation 20 and substrate 30 may be penetrated if needed. Furthermore, the preferred embodiment employs a channel 32 which is constructed generally parallel to the soil grade at a distance of approximately three to six inches above the soil. However, this channel 32 need not be parallel to the soil grade, nor this close to the soil surface as long as an adequate barrier can be formed in it.

The outer component 10 of the EIF System 2 and void areas between the outer component 10 and inner component 30 are exposed through the cavity 32 in a horizontal cross-section manner, so that, from the exterior of the building, an observer may look at the substrate 30 of the structure.

Figure 2A:
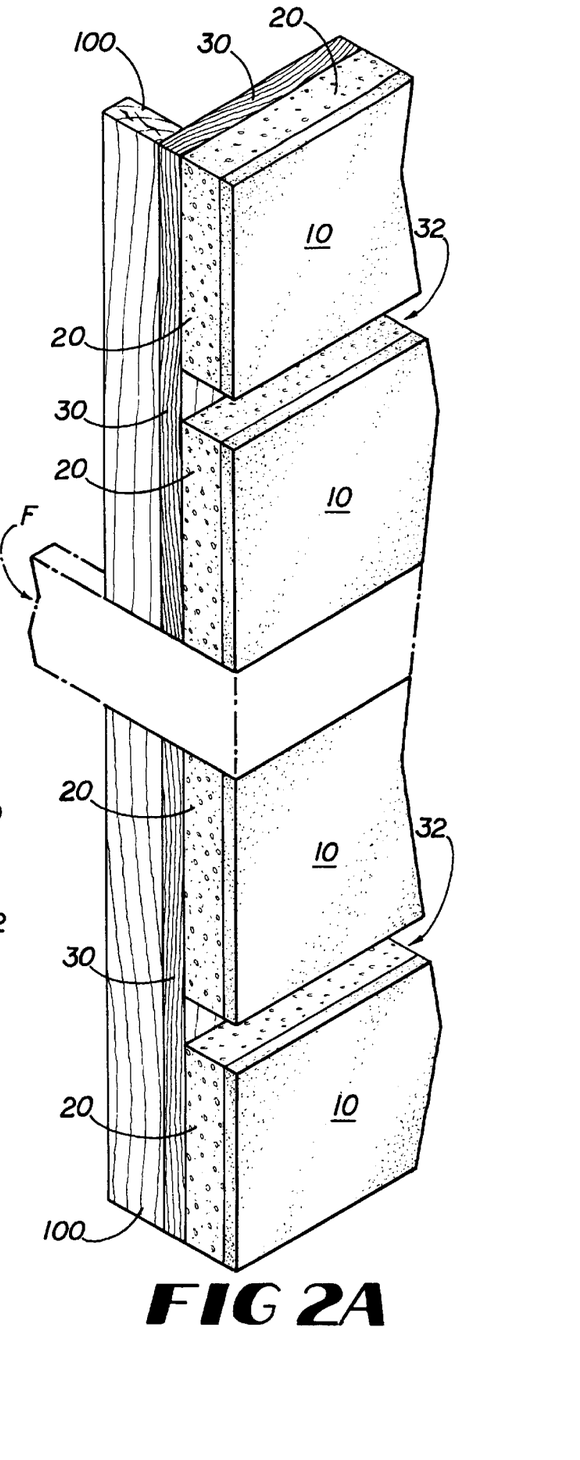
FIG. 2A is a perspective view of a two floor architectural structure, both floors having an inspection channel according to the first preferred embodiment of the present invention.

FIG. 2A shows a perspective view of the EIF system incorporated in an architectural structure having more than one floor. Floor F separates the two floors of the architectural structure, wherein both floors incorporate a cavity 32.

Figure 3:
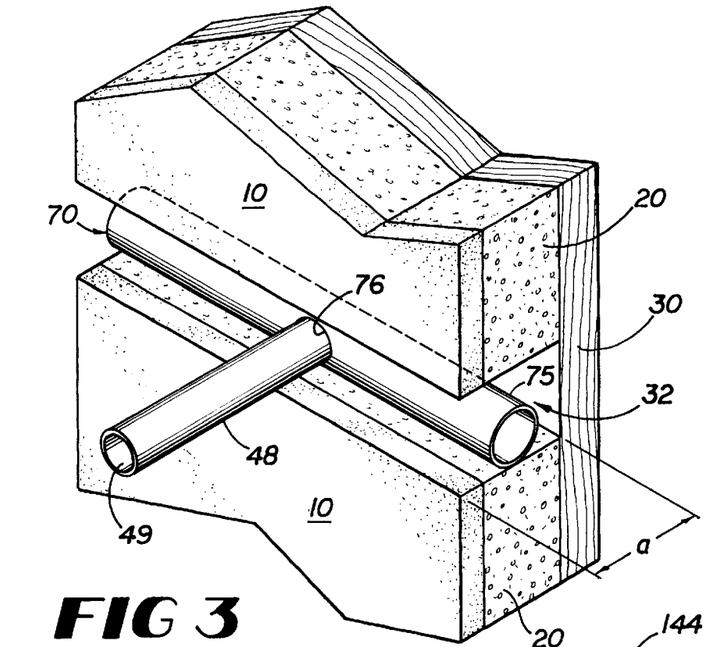
FIG. 3 is a second perspective view of the second preferred embodiment of the present invention.

In the second embodiment, upon construction of the cavity 32, a tubing system 70 is placed into the cavity 32, as shown in FIG. 3. The tubing 70 has spaced holes 76 designed to allow the application of a termiticide into the cavity 32. The tubing system 70 used may be the system of U.S. patent application Ser. No. 60/021,378.

External injection ports 48 are used for terrniticide injection, extending from the tubing 70 at predetermined intervals allowing for the subsequent retreatments of the building with termiticide. It is preferred that the distance between external injection ports 48 be approximately ten feet.

Figure 4:
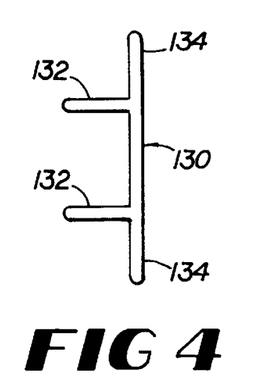
FIG. 4 is a side view of an inspection panel of the present invention.
Figure 5:
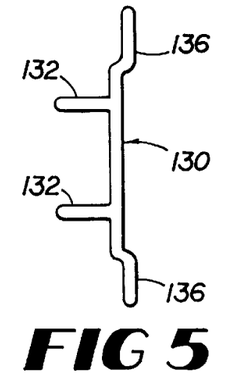
FIG. 5 is a side view of a second embodiment of an inspection panel.

FIG. 4 shows a side view of an inspection panel 130 of the second embodiment of the present invention. The inspection panel 130 has two prongs or tracks 132 which enter into cavity 32, as shown in FIGS. 2–3, in order to provide support and surfaces on which sealant may be applied to or allow for other attachment means to hold the inspection panel 130 in place over the cavity 32. The ends 134 of the inspection panel 130 additionally provide surfaces for the inspection panel 130 to be secured to the base coat 10 of the structure. The two prongs 132 fit snug against the upper and lower cavity walls or may be attached to the cavity walls. While the prongs 132 are not essential to the invention, they provide an excellent installation mechanism for the inspection panel 130 which is substantially watertight when utilized in conjunction with a sealant, for example, Dow Coming 795 silicone sealant, which keeps moisture out and termiticide in. In FIG. 5, the ends 136 are shown having a bend which may be an installation advantage. In the second embodiment, the inspection panel 130 is constructed of clear PVC material because it is easy to cut and install and inexpensive to produce, however, any suitable clear material may be utilized.

Figure 6:
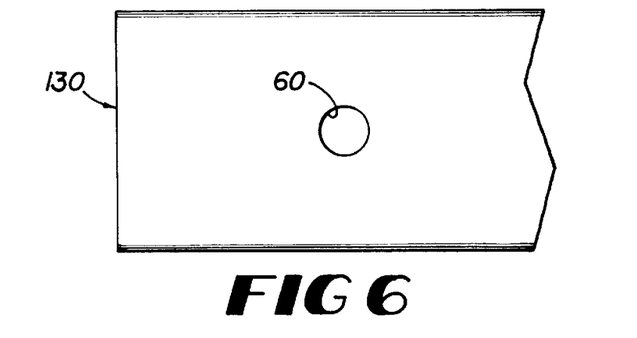
FIG. 6 is a frontal view of an inspection panel having a hole.

With the tubing system 70 installed within cavity 32, the inspection panel 130 of FIGS. 4 or 5 is installed over the cavity 32 so that the intake ends 49 of the injection ports 48 are received through holes 60 in the panel 130, as shown in FIG. 6. The ports 48 may extend to a point flush with the inspection panel 130 and be sealed or otherwise held in place, or may extend farther through the holes 60.

The inspection panel 130 may cover the entire cavity 32 and, alternatively, may be bolted, screwed, glued, or wedged into the cavity 32, which maintains the inspection panel 130 in an attached and substantially watertight fashion.

Figure 7:
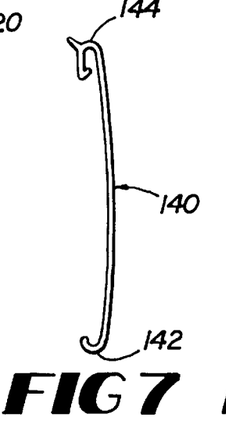
FIG. 7 is a side view of a protection panel of the present invention.
Figure 8:
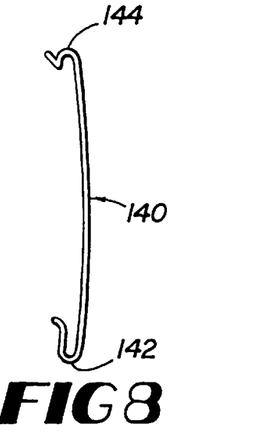
FIG. 8 is a side view of a second embodiment of a protection panel.

After the present system is installed, a termiticide may be injected through the external injection ports 48. (FIG. 3) Based on the treatment program designed for each structure, a specific termiticide or combination of termiticides can be selected. Once the termiticide is injected into the injection ports 48, a protection panel 140 may be installed over the inspection panel 130. (FIG. 7) The protection panel 140 may be painted or formed to match the color and texture of the wall's exterior. The protection panel 140 may be installed over the inspection panel 130 by any known installation means including adhesion, bolts, screws or the like; however, preferably, the protection panel 140 is constructed so that it clips to the edges 134 of the inspection panel 130 to allow for easy installation and removal, as shown in FIGS. 7 and 8.

The protection panel 140 may be constructed of any suitable material, but is fabricated from General Electric's Geloy™/DuPont's Alcry™ material in the preferred embodiment. This material has a heat deflection temperature of 255° C., and will not warp when exposed to direct sun. The retention clips 142 and 144 are utilized as attachment means to releasably attach the protection panel 140 in a position to protect and cover the inspection panel 130. The retention clips 142, 144 may be an integral part of the panel 140 when formed, or added to the panel 140 later by a suitable attachment. The first retention clip 142 is designed to be slid onto one end 134 of the inspection panel 130 and the second retention clip 144 is designed to be pressed against the opposing end 134 of the inspection panel 130 to cause the second retention clip 144 to flex and clip to the opposing end 134 of the inspection panel 130. Alternatively, the retention clips 142, 144 can be designed to fit onto the top and bottom edges of the cavity 32. The protection panel 140 may also be formed in an alternate manner and attached by any suitable means including bolting or adhering to the inspection panel 130 or the outer component 10 of the EIF System 1. FIGS. 7 and 8 also, show alternate configurations of the retention clips 142 and 144.

Figure 9:
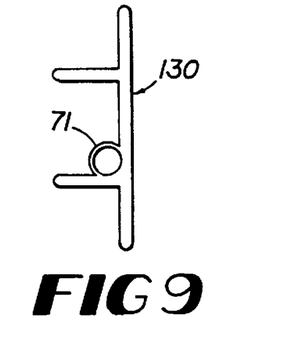
FIG. 9 is a side view of an inspection panel having a channel.

In a third preferred embodiment, the tubing and injection ports are integrally formed in the clear inspection panel 130 itself, and in a channel 71 inside the inspection panel 130, as shown in FIG. 9. Perforations are formed into this channel 71 on the interior of the inspection panel 130 for the application of the termiticide. Alternatively, tubing can be run through the channel 71. The perforations and injection ports serve primarily the same purpose as described in the second preferred embodiment. Preferably, the interior channel 71, perforations and injection ports can be formed at the time the panel 130 is constructed as a unitary structure. The attachment means of the inspection panel 130, the protection panel 140 and the cavity 32 also may be substantially similar to the embodiment described above.

A plug (not shown) constructed of any suitable material may also be utilized in either embodiment to fill any holes made in the protective panel 140 corresponding to the holes 60 in the inspection panel 130 to create a watertight seal.

There are various other embodiments of the present invention. In another embodiment, termiticide may be injected directly into the cavity 32 through hole 60 without any tubing in the cavity when termite activity is seen or suspected. (FIG. 6). In this embodiment, a plug may be utilized to fill the hole 60 to create a watertight seal to keep moisture out and the termiticide in.

Figure 10:
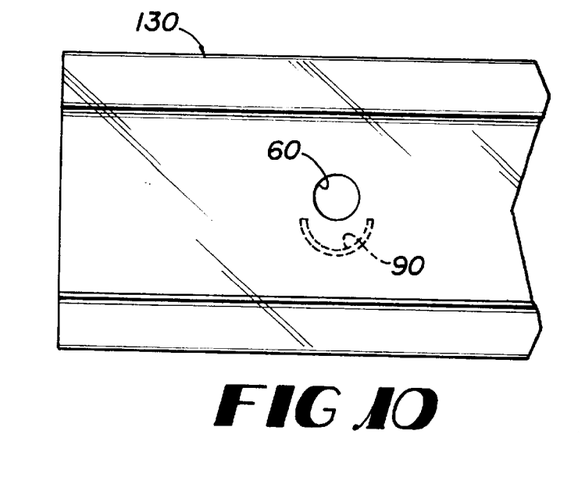
FIG. 10 is a front view of the invention panel when used as a built-in termite baiting system according to another embodiment of the present invention.
Figure 11:
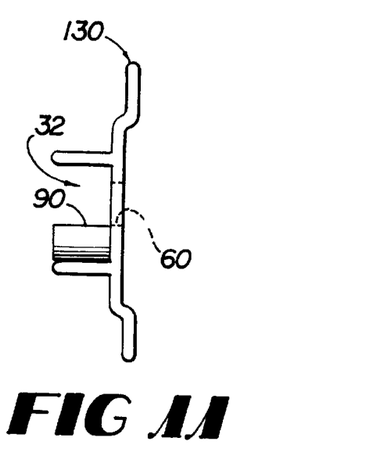
FIG. 11 is a side view of the inspection panel FIG. 10.

The present invention may be modified to become a baiting system. In this embodiment, a baiting system replaces the tubing system, where the baiting system comprises small bait reservoirs 90 which will hold termite baiting material, as shown in FIG. 10. At approximately 5 foot intervals, the baiting system has a bait reservoir 90 on the inside of the inspection panel 130. The bait is added through the holes 60 in the inspection panels 130, and the holes 60 may be capped upon baiting FIG. 11 is a side view of FIG. 10.

Figure 12:
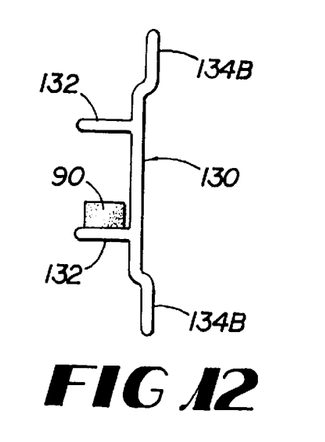
FIG. 12 is a side view of the inspection panel of FIG. 5 having a bait reservoir.

FIG. 12 shows inspection panel 130 with edges 134B and prongs 132, wherein bait reservoir 90 is on the inside of the inspection panel 130 on the upper surface of the bottom prong.

Figure 13:
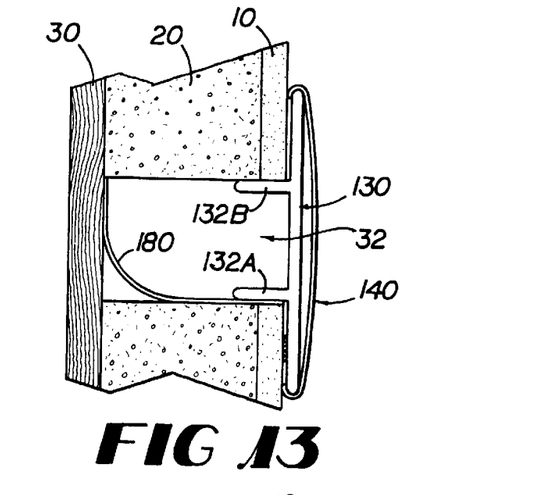
FIG. 13 is a side view of the present invention incorporation a termite shield.

FIG. 13 shows the first preferred embodiment incorporating a termite shield 180. The termite shield 180 clips between the lower cavity wall and lower prong 132a of inspection panel 130. The termite shield 180 extends into cavity 32, and preferably rests against substrate 30. Shield 180 creates a barrier to termite travel within cavity 32, while providing adequate draining of cavity 32, should water enter the cavity 32. A small aperture or grove in the shield 180 may be used to facilitate draining. This first preferred embodiment does not require the use of any termiticides until termites make an appearance. When the protection panel 140 is removed an observer can check the cavity through the inspection panel to see if there are any termites or termite tunnels present. Periodic holes may be placed in the inspection panel 130 through which a termiticide may be injected at any location where termites are observed. A plug or cap can be provided for the inspection hole. It has been found that condensation can enter the cavity 32 from the ground or from above. Periodic drain or weep holes can be provided to drain that cavity. These weep holes may be placed in the termite shield 180 or in the outer wall which abuts the cavity 32.

Figure 14:
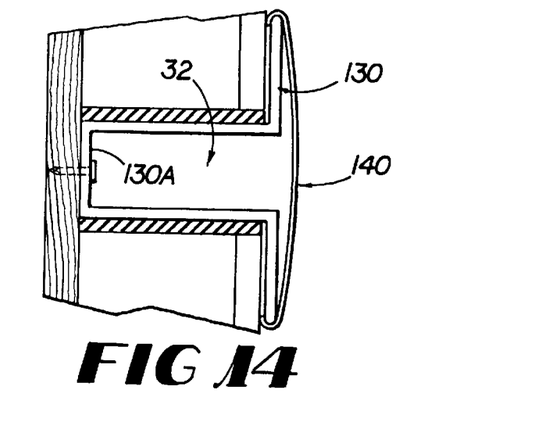
FIG. 14 shows another embodiment of the present invention wherein an inspection panel is designed as a termite shield.
Figure 15:
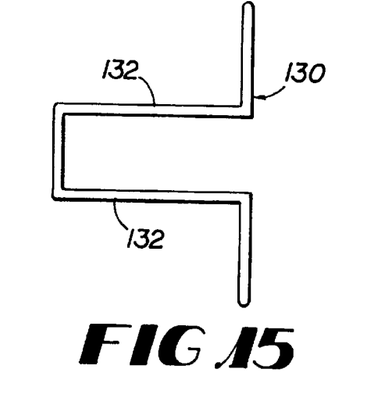
FIG. 15 shows the inspection panel of FIG. 14.

Alternatively, the inspection panel 130 may itself become a termite barrier. As shown in FIGS. 14 and 15, prongs 132 extend the entire depth of channel 32, and form a continuous insert.

In this embodiment, inspection panel 130 hinders termite advancement across channel 32, as it is formed as a continuous barrier in channel 32. Inspection panel 130 is constructed of material which allows for visual inspection of channel 32, and, specifically, for termite activity behind distal end 130a of inspection panel 130.

In all of the embodiments, the present invention protects the termiticides and bait from various environmental hazards such as rain and wind. This protection extends to limit any chemical exposure of the termiticides to humans and pets.

It should be obvious to one of ordinary skill in the art that this method and apparatus could be utilized with internal portions and walls of a structure which are constructed of suitable materials which may need internal inspection.

What is claimed is:

1. An architectural structure having exterior walls extending around the outside of the architectural structure, the exterior walls constructed in soil, the exterior walls having inner and outer components, where said exterior walls may permit the invasion of insects from the soil through the inner component of said exterior walls, or between the inner and outer components of said exterior walls and into the inner component, said architectural structure comprising:

(a) a continuous viewing cavity in a portion of the outer component of the exterior walls extending around at least a substantial portion of the outside of the architectural structure, said cavity being generally parallel to and above the soil and in relatively close proximity to the soil;

(b) an inspection panel extending over said cavity and attached by attachment means to the outer component of said exterior walls, said inspection panel enclosing said cavity;

(c) a removable protection panel with attachment means for covering and protecting the inspection panel; and (d) a tubing system for the injection of insecticide into said cavity at periodic locations so as to repel or kill any insects attempting to traverse the cavity to the interior of the architectural structure, said tubing system having tubing with spaced holes to dispense insecticide into the cavity, said tubing further incorporating external injection ports having distal ends for receiving an insecticide;

wherein said inspection panel is formed of a transparent material which allows for visual inspection therethrough and wherein said attachment means is a track assembly having two attached prongs, said prongs at least partially supporting said inspection panel by extending inside the viewing cavity which has a top and bottom with said prongs being in contact therewith; and wherein said inspection panel has holes at spaced intervals for receving the distal ends of spaced external injection ports.

2. The architectural structure of claim 1, wherein said tubing system is formed integrally with said inspection panel.

3. The architectural structure of claim 1, wherein the attachment means for the protection panel are clips for removably clipping to and securing the protection panel to the inspection panel.

4. A method for monitoring and preventing the entry of insects into architectural structures having exterior walls extending around the outside of the architectural structure, the architectural structure having at least two floors and not incorporating an expansion joint in the exterior walls between adjacent floors, the exterior walls constructed in soil, the exterior walls having inner and outer components, where said exterior walls may permit the invasion of insects from the soil through the inner component of said exterior walls, or between the inner and outer components of said exterior walls and into the inner component, said method comprising the steps of:

(a) creating a continuous viewing cavity in a portion of the outer component of the exterior walls between adjacent floors, said cavity extending around at least a substantial portion of the outside of the architectural structure, said cavity being generally parallel to and above the soil, said cavity also serving as an expansion joint for the architectural structure;

(b) securing an inspection panel over said cavity, said inspection panel enclosing said cavity;

(c) providing a removable protection panel with attachment means for covering and protecting the inspection panel.

5. A method for monitoring and preventing the entry of insects into architectural structures having exterior walls extending around the outside of the architectural structure, the exterior walls constructed in soil, the exterior walls having inner and outer components, where said exterior walls may permit the invasion of insects from the soil through the inner component of said exterior walls, or between the inner and outer components of said exterior walls and into the inner component, said method comprising the steps of:

(a) creating a continuous viewing cavity in a portion of the outer component of the exterior walls extending around at least a substantial portion of the outside of the architectural structure, said cavity being generally parallel to and above the soil and in relatively close proximity to the soil;

(b) securing an inspection panel over said cavity, said inspection panel enclosing said cavity, said inspection panel having bait reservoirs which hold insect baiting material on an inside of said inspection panel; and (c) providing a removable protection panel with attachment means for covering and protecting the inspection panel.

6. The method of claim 5, which said bait reservoirs are located at periodic places on the inspection panel extending into said cavity, said inspection panel having periodic holes in communication with said bait reservoirs for the placement of bait or insecticide in said bait reservoirs.

7. A method for monitoring and preventing the entry of insects into architectural structures having exterior walls extending around the outside of the architectural structure, the exterior walls constructed in soil, the exterior walls having inner and outer components, where said exterior walls may permit the invasion of insects from the soil through the inner component of said exterior walls, or between the inner and outer components of said exterior walls and into the inner component, said method comprising the steps of (a) creating a continuous viewing cavity in a portion of the outer component of the exterior walls extending around at least a substantial portion of the outside of the architectural structure, said cavity being generally parallel to and above the soil and in relatively close proximity to the soil;

(b) securing an inspection panel over said cavity, said inspection panel enclosing said cavity, said inspection panel formed from a material which allows for visual inspection of the cavity to determine the extent, if any, of insect infestation; and (c) providing a removable protection panel with clips for removably clipping to and securing said protection panel to said inspection panel, said protection panel being painted or fabricated to coordinate with or match said outer component of said exterior wall.

8. The method according to claim 7, further comprising the step of (d) providing adequate drainage of said cavity to prevent the accumulation of water in said cavity.

9. A method for monitoring and preventing the entry of insects into architectural structures having exterior walls extending around the outside of the architectural structure, the exterior walls constructed in soil, the exterior walls having inner and outer components, where said exterior walls may permit the invasion of insects from the soil through the inner component of said exterior walls, or between the inner and outer components of said exterior walls and into the inner component, said method comprising the steps of (a) creating a continuous viewing cavity in a portion of the outer component of the exterior walls extending around at least a substantial portion of the outside of the architectural structure, said cavity being generally parallel to and above the soil and in relatively close proximity to the soil;

(b) securing an inspection panel over said cavity, said inspection panel enclosing said cavity;

(c) providing a removable protection panel with attachment means for covering and protecting the inspection panel; and (d) providing a tubing system with spaced holes for dispensing insecticide into said cavity at periodic locations so as to repel or kill any insects attempting to traverse the cavity to enter the interior of the architectural structure, which tubing system is formed integrally with said inspection panel.

* * * * *